(12) United States Patent
Fliearman

(10) Patent No.: US 10,434,836 B2
(45) Date of Patent: Oct. 8, 2019

(54) TORQUE COMPENSATED WALKING BEAM ASSEMBLY WITH JOURNAL JOINT

(71) Applicant: Deere & Company, Moline, IL (US)

(72) Inventor: Steven R. Fliearman, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 335 days.

(21) Appl. No.: 15/255,816

(22) Filed: Sep. 2, 2016

(65) Prior Publication Data

US 2018/0065439 A1 Mar. 8, 2018

(51) Int. Cl.
| | |
|---|---|
| *B60G 21/02* | (2006.01) |
| *B60G 21/045* | (2006.01) |
| *B60G 21/00* | (2006.01) |
| *B60K 17/04* | (2006.01) |
| *B60K 17/36* | (2006.01) |
| *E02F 9/02* | (2006.01) |
| *E02F 3/76* | (2006.01) |
| *E02F 9/08* | (2006.01) |
| *F16H 37/06* | (2006.01) |

(52) U.S. Cl.
CPC ........... *B60G 21/02* (2013.01); *B60G 21/002* (2013.01); *B60G 21/045* (2013.01); *B60K 17/046* (2013.01); *B60K 17/36* (2013.01); *E02F 3/7636* (2013.01); *E02F 9/02* (2013.01); *E02F 9/0808* (2013.01); *B60G 2200/318* (2013.01); *F16H 37/065* (2013.01)

(58) Field of Classification Search
CPC combination set(s) only.
See application file for complete search history.

(56) References Cited

U.S. PATENT DOCUMENTS

| | | | | |
|---|---|---|---|---|
| 2,411,885 | A | * | 12/1946 | Larison .................. B60G 5/053 280/686 |
| 2,819,910 | A | | 1/1958 | Walter |
| 2,824,615 | A | * | 2/1958 | Louis Lado ......... B60K 17/342 180/24.05 |
| 3,166,142 | A | | 1/1965 | Frazier |
| 3,786,888 | A | | 1/1974 | Nelson |
| 3,792,871 | A | | 2/1974 | Chalmers |

(Continued)

OTHER PUBLICATIONS

European Patent Office, Extended European Search Report for Application No. 17184564.7-1012 dated Jan. 10, 2018.

*Primary Examiner* — Barry Gooden, Jr.
(74) *Attorney, Agent, or Firm* — Klintworth & Rozenblat IP LLP

(57) ABSTRACT

A vehicle walking beam assembly includes a support beam and a mount member configured to rotatably mount the support beam on the chassis. A gear assembly with a gear train and a gear housing is supported by the support beam. The gear train includes a gear with a first journal surface, and the housing includes a second journal surface. The walking beam assembly additionally includes an input drive assembly that delivers input torque from the engine to the gear train. Moreover, the walking beam assembly includes a reaction member connected to one of the gear housing and the gear of the gear train. The reaction member is configured to transfer a reaction force between the chassis and the one of the gear housing and the gear of the gear train as the first journal surface journals on the second journal surface.

18 Claims, 8 Drawing Sheets

(56) References Cited

U.S. PATENT DOCUMENTS

| | | | | |
|---|---|---|---|---|
| 4,210,218 | A | * | 7/1980 | Oswald ................ B60K 17/342 |
| | | | | 180/24.12 |
| 4,285,627 | A | * | 8/1981 | Oswald .................... B60G 5/01 |
| | | | | 180/24.12 |
| 4,407,381 | A | * | 10/1983 | Oswald ................ B60K 17/342 |
| | | | | 180/24.12 |
| 4,577,711 | A | * | 3/1986 | Butler ...................... B60G 5/06 |
| | | | | 180/24.1 |
| 5,016,905 | A | | 5/1991 | Licari |
| 5,339,611 | A | * | 8/1994 | Roderfeld ................ B60G 5/00 |
| | | | | 180/209 |
| 5,417,297 | A | | 5/1995 | Auer |
| 7,229,094 | B2 | | 6/2007 | Miller et al. |
| 7,296,642 | B1 | | 11/2007 | Dewald |
| 7,832,509 | B2 | | 11/2010 | Thomson et al. |
| 8,262,125 | B2 | | 9/2012 | Sergison et al. |
| 8,733,489 | B2 | * | 5/2014 | Heine ................... B60W 10/06 |
| | | | | 180/170 |
| 2002/0157891 | A1 | * | 10/2002 | Hurlburt ................ B60K 17/36 |
| | | | | 180/264 |
| 2003/0159863 | A1 | * | 8/2003 | Hurlburt .................. B60G 9/02 |
| | | | | 180/24.12 |
| 2003/0159871 | A1 | * | 8/2003 | Hurlburt .................. B60G 9/02 |
| | | | | 180/209 |
| 2004/0079572 | A1 | * | 4/2004 | Hurlburt .............. B62D 31/006 |
| | | | | 180/208 |
| 2006/0145433 | A1 | * | 7/2006 | Kim ........................ A61G 5/046 |
| | | | | 280/5.28 |
| 2008/0164664 | A1 | * | 7/2008 | Anderson ............ B60G 21/023 |
| | | | | 280/5.5 |
| 2018/0065440 | A1 | * | 3/2018 | Fliearman ............ B60G 21/002 |
| 2018/0312060 | A1 | * | 11/2018 | Varela .................... B60K 17/36 |

* cited by examiner

TORQUE COMPENSATED WALKING BEAM ASSEMBLY WITH JOURNAL JOINT

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to work vehicles and, more particularly, relates to a torque compensated walking beam assembly with a journal joint for work vehicles.

BACKGROUND OF THE DISCLOSURE

Work vehicles, particularly those work vehicles configured for carrying heavy loads, may include a tandem axle wheel arrangement with a plurality of power driven wheels. In some cases, two or more wheels are disposed on the same side of the vehicle and torque is delivered to each wheel.

In some cases, a walking beam assembly (i.e., a Bogie suspension) is included for attaching these wheels to the vehicle chassis. The walking beam assembly may be used to transfer and distribute forces between the wheels as the work vehicle travels. The walking beam assembly may also distribute downforce substantially evenly across the multiple wheels.

SUMMARY OF THE DISCLOSURE

This disclosure provides a torque compensated walking beam assembly with a journal joint for a work vehicle.

In one aspect the disclosure provides a torque compensating walking beam assembly for a vehicle that includes an engine, a chassis, and a wheel. The walking beam assembly includes a support beam that includes an end. The walking beam assembly also includes a mount member that is configured to mount the support beam on the chassis such that the support beam is able to rotate relative to the chassis. The walking beam assembly further includes a gear assembly that is supported by the support beam. The gear assembly includes a gear train and a gear housing. The gear train is operably coupled to a wheel hub, and the wheel hub is configured to support a wheel of the vehicle. The gear housing substantially encloses the gear train. The gear train includes a gear with a first journal surface, and the gear housing includes a second journal surface. The walking beam assembly additionally includes an input drive assembly configured to deliver an input torque from the engine to the gear train. Moreover, the walking beam assembly includes a reaction member configured to connect to the chassis. The reaction member is connected to one of the gear housing and the gear of the gear train. The reaction member is configured to transfer a reaction force between the chassis and the one of the gear housing and the gear of the gear train as the first journal surface journals on the second journal surface.

In another aspect, the disclosure provides a method of manufacturing a torque compensating walking beam assembly for a vehicle that includes an engine, a chassis, and a wheel. The method includes providing a support beam configured to be mounted to the chassis for rotation relative to the chassis. The method also includes assembling a gear assembly. The gear assembly includes a gear housing and a gear train. The gear train includes a gear with a first journal surface. The gear housing includes a second journal surface that is configured to journal on the first journal surface. The method further includes supporting the gear assembly on the support beam. Additionally, the method includes attaching a reaction member to one of the gear housing and the gear train. The reaction member is configured to connect to the chassis. The reaction member is configured to transfer a reaction force between the chassis and the one of the gear housing and the gear of the gear train as the first journal surface journals on the second journal surface.

In an additional aspect, the disclosure provides a work vehicle that includes an engine, a chassis that supports the engine, and a first and second wheel that support the chassis. The work vehicle also includes a walking beam assembly. The walking beam assembly includes a support beam and a mount member that mounts the support beam on the chassis such that the support beam is rotatable relative to the chassis. The walking beam assembly further includes a first gear assembly and a second gear assembly supported on opposite ends of the support beam. The first gear assembly includes a first planetary gear train and a first gear housing that substantially houses the first planetary gear train. The second gear assembly includes a second planetary gear train and a second gear housing that substantially houses the second planetary gear train. A first wheel hub of the first wheel is operatively coupled to the first planetary gear train. A second wheel hub of the second wheel is operatively coupled to the second planetary gear train. The walking beam assembly further includes an input drive assembly configured to deliver an input torque from the engine to the first gear train and the second gear train to rotate the first and second wheels. The walking beam assembly further includes a first reaction member and a second reaction member. The first gear train includes a first ring gear with a first journal surface, and the first gear housing includes a second journal surface. The second gear train includes a second ring gear with a third journal surface, and the second gear housing includes a fourth journal surface. The first reaction member is connected to the chassis and one of the first ring gear and the first gear housing. The first reaction member is configured to transfer reaction force between the chassis and the one of the first ring gear and the first gear housing as the first journal surface journals on the second journal surface. The second reaction member is connected to the chassis and one of the second ring gear and the second gear housing. The second reaction member is configured to transfer reaction force between the chassis and the one of the second ring gear and the second gear housing as the third journal surface journals on the fourth journal surface.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
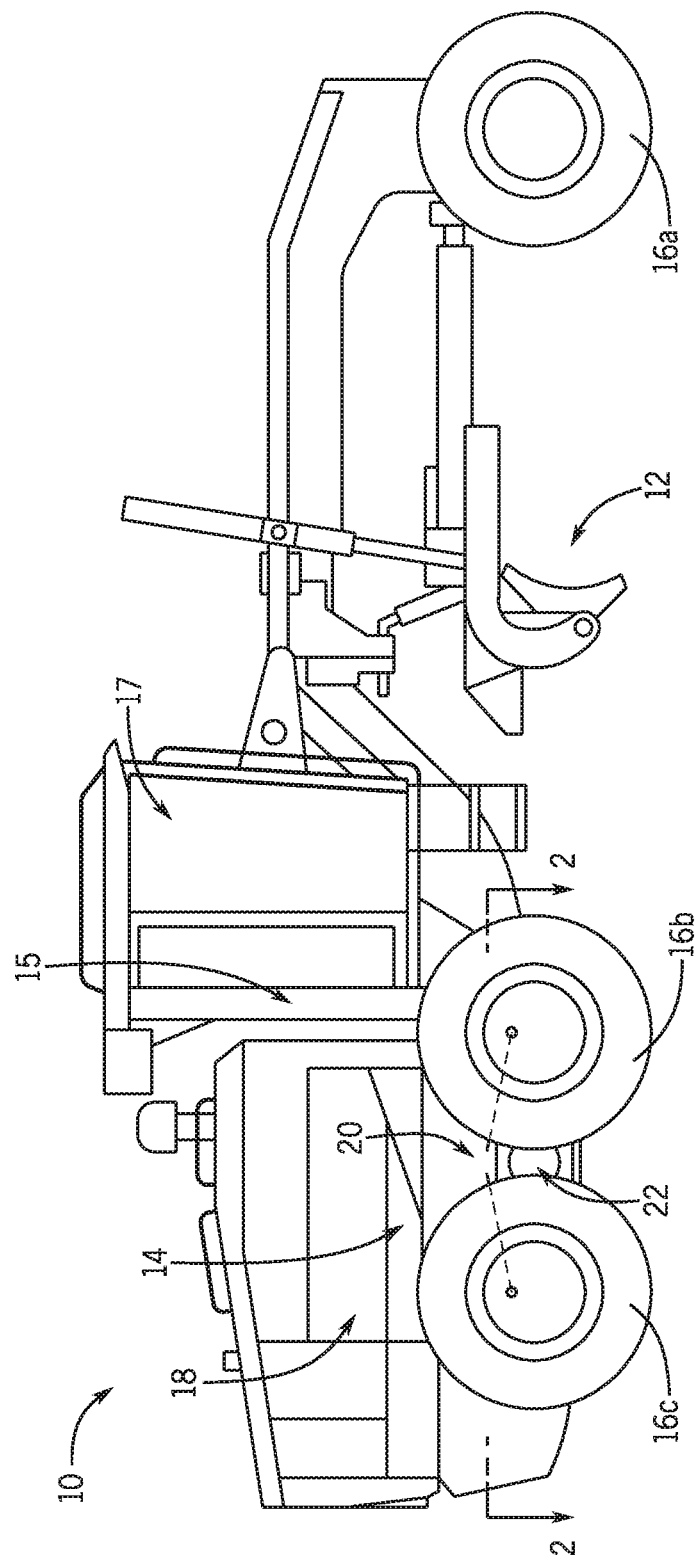
FIG. 1 is a side view of a work vehicle in the form of a motor grader with a walking beam assembly according to example embodiments of the present disclosure.

The following describes one or more example embodiments of a walking beam assembly with a journal joint, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Furthermore, in detailing the disclosure, terms of direction, such as "forward," "aft," "lateral," "horizontal," and "vertical" may be used. Such terms are defined, at least in part, with respect to the direction in which the work vehicle or implement travels during use. The term "forward" and the abbreviated term "fore" (and any derivatives and variations) refer to a direction corresponding to the direction of travel of the work vehicle, while the term "aft" (and derivatives and variations) refer to an opposing direction. The term "fore-aft axis" may also reference an axis extending in fore and aft directions. By comparison, the term "lateral axis" may refer to an axis that is perpendicular to the fore-aft axis and extends in a horizontal plane; that is, a plane containing both the fore-aft and lateral axes. The term "vertical," as appearing herein, refers to an axis or a direction orthogonal to the horizontal plane containing the fore-aft and lateral axes.

The following describes one or more example implementations of the disclosed walking beam assembly of a vehicle as shown in the accompanying figures. In one example application, the disclosed walking beam assembly is configured to provide improved downforce distribution to a set of tandem wheels during operation of a work vehicle, especially during acceleration and deceleration of the vehicle in which the disclosed arrangement may respond with reactive forces or moments to maintain both wheels into engagement with the ground.

In one example, the disclosed walking beam assembly includes a support beam with attached gear assemblies for each wheel hub. Operation of the walking beam assembly may impart a moment on the support beam such that one wheel tends to lift off the ground and another wheel tends to drive into the ground. However, the walking beam assembly includes features that provide a reaction force (i.e., a reaction moment that opposes the imparted moment). The reaction force counteracts the imparted moment to maintain the wheels on the ground, exerting substantially equal torque on the ground surface.

The walking beam assembly may include reaction members that extend between the gear assemblies and the chassis (i.e., frame) of the vehicle to provide the reaction force. At least one reaction member may be attached to one of the gears of the respective gear assembly, either directly or indirectly. That gear may be supported for rotation relative to the gear housing. Accordingly, the gear may rotate and journal on the gear housing. In some embodiments, the ring gear of the gear train may rotate and journal on the gear housing.

As such, the assembly may be compact. Also, manufacture and assembly of the walking beam assembly may be facilitated due to the journal bearing. Additionally, the journal joint may be configured such that a lubricant may lubricate the gear train as well as the journal joint.

FIG. 1 illustrates an example embodiment of a work vehicle, which may include a walking beam assembly according to this disclosure. Various features of the disclosed walking beam assembly will be discussed according to example embodiments.

The work vehicle 10 may be of various types, such as a motor grader. However, it will be appreciated that the work vehicle 10 may be another type without departing from the scope of the present disclosure (e.g., a truck, a dozer, other vehicles used in the construction, agriculture, or forestry industries, etc.).

As shown in FIG. 1, the work vehicle 10 may include a chassis 14 (i.e., a vehicle frame) and a body 15. The chassis 14 supports the body 15. The body 15 may include an operator compartment 17. The work vehicle 10 may also include an implement 12, such as a grader blade, bucket, shovel, etc., which is supported by the chassis 14. The work vehicle 10 may also include a plurality of wheels 16a, 16b, 16c, and a suspension 20 that connects at least some of the wheels 16a, 16b, 16c to the chassis 14. The suspension 20 may support the chassis 14 upon the wheels 16a, 16b, 16c. FIG. 1 shows one side of the vehicle 10 and shows a front wheel 16a and two rear wheels 16b, 16c. The opposite side of the work vehicle 10 may include corresponding wheels as well. It will be appreciated that the configuration of the wheels 16a, 16b, 16c shown in FIG. 1 is merely an example and that work vehicle 10 may include another configuration (e.g., a different number of wheels or wheels in different positions) without departing from the scope of the present disclosure.

The vehicle 10 may also include a power source, such as an engine 18. The engine 18 may be an internal combustion engine, such as a diesel engine, in some embodiments. The engine 18 may operate to generate torque and power, which is ultimately delivered to at least one of the wheels 16a, 16b, 16c. In additional embodiments, the vehicle 10 may include an electric motor or other type of power source.

Additionally, the suspension 20 may include at least one walking beam assembly 22 (i.e., a working beam or Bogie suspension). The walking beam assembly 22 may be mounted to the chassis 14. Also, at least two of the wheels (e.g. the rear wheels 16b, 16c) may be mounted on the walking beam assembly 22. The wheels 16b, 16c may be considered tandem wheels supported on tandem axles. The walking beam assembly 22 may connect the wheels 16b, 16c to the chassis 14. The walking beam assembly 22 may also include features that deliver torque and power from the engine 18 to the wheels 16b, 16c. Additionally, in some embodiments, the walking beam assembly 22 may include at least one gear train (i.e., final drive) that increases torque delivered to the wheels 16b, 16c. Furthermore, the walking beam assembly 22 may distribute substantially balanced down force (i.e., force directed toward the ground) to the wheels 16b, 16c. Moreover, the walking beam assembly 22 may counteract forces that tend to lift one of the wheels 16b, 16c off of the ground while counteracting forces that tend to drive the other wheel 16b, 16c toward the ground.

Referring now to FIGS. 2, 3, 4, 5, 6A, and 6B, the walking beam assembly 1022 is shown according to example embodiments. Generally, the walking beam assembly 1022 may include a support beam 1024, a mount member 1026, a first gear assembly 1028 (i.e., a first final drive assembly), a second gear assembly 1030 (i.e., a second final drive assembly), an input drive assembly 1032, a first reaction member 1034, and a second reaction member 1036.

As will be discussed, the first gear assembly 1028 may define a journal joint, which is used to rotationally attach the first reaction member 1034 to the first gear assembly 1028. Also, the second gear assembly 1030 may define a journal joint, which is used to rotationally attach the second reaction member 1036 to the second gear assembly 1030. These journal joints may allow the first and second gear assemblies 1028, 1030 to be relatively compact. Also, the journal joints may provide manufacturing efficiencies. Moreover, the journal joints may be effectively lubricated by the same lubricant that lubricates gears within the gear assemblies 1028, 1030 as will be discussed.

The walking beam assembly 1022 will now be discussed in detail according to the illustrated embodiment. In general, the walking beam assembly 1022 may include an outboard side 1202 that faces outboard from the vehicle, an inboard side 1204 that faces inboard toward a centerline of the vehicle. Additionally, the walking beam assembly 1022 may include an upper side 1205 and a lower side 1207.

Figure 4:
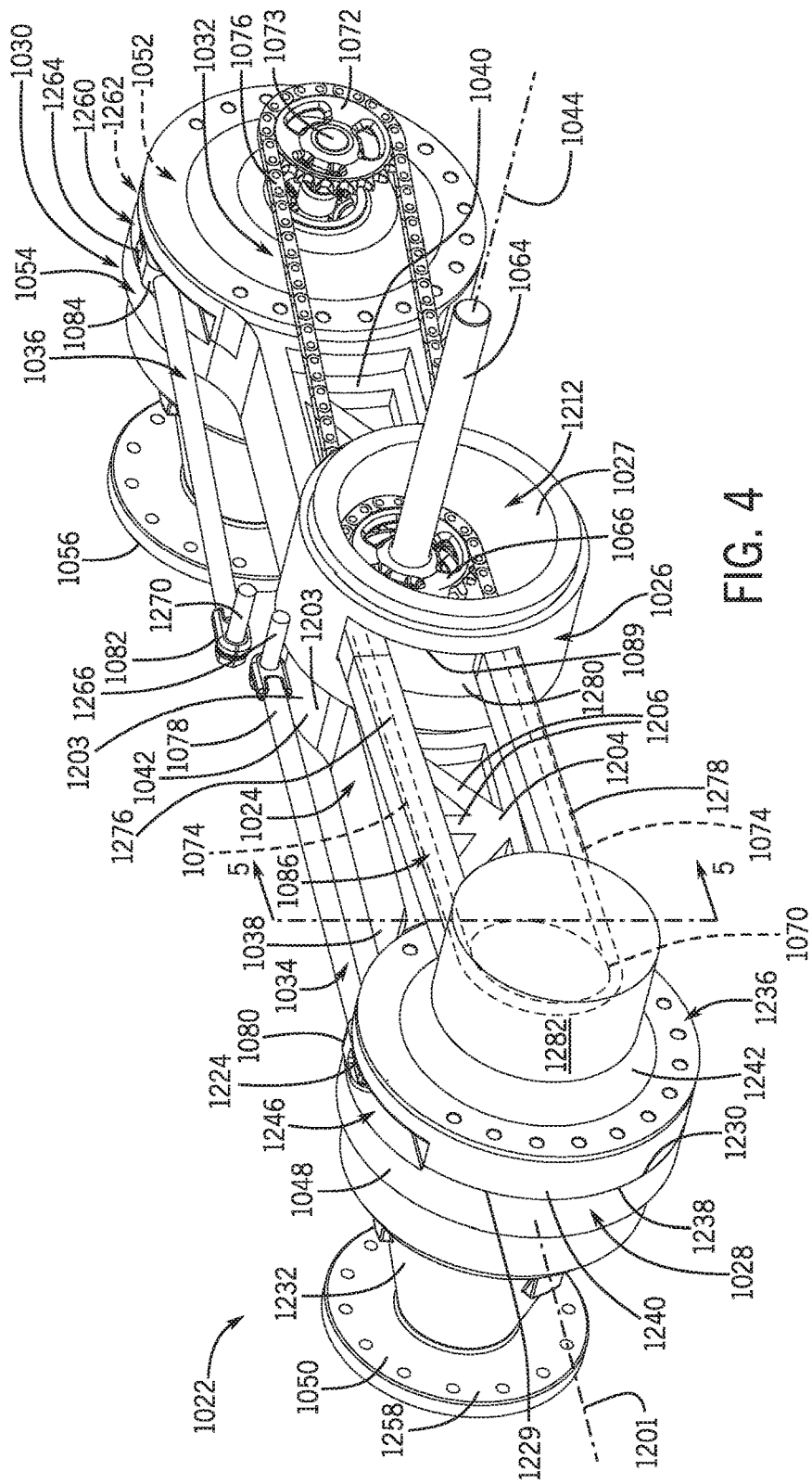
FIG. 4 is a perspective view looking outboard of the walking beam assembly of FIG. 2.

The support beam 1024 will be discussed with reference primarily to FIGS. 2 and 4. The support beam 1024 may be an elongate, linear, and straight beam with a first end 1038, a second end 1040, and a middle portion 1042. The first and second ends 1038, 1040 may be separated along a longitudinal axis 1201 with the middle portion 1042 disposed between the first and second ends 1038, 1040. The middle portion 1042 may include an annular, ring-shaped portion 1203, which is substantially centered on a transverse axis 1044. The first and second ends 1038, 1040 of the beam 1024 may extend away in opposite directions from the annular portion 1203 along the longitudinal axis 1201. The middle portion 1042 and the first and second ends 1038, 1040 may be integrally attached in some embodiments. The middle portion 1042 may also be hollow whereas the first and second ends 1038, 1040 of the beam 1024 may be substantially solid in cross section. The support beam 1024 may be rigid and strong to resist bending and to support other components of the walking beam assembly 1022. For example, the support beam 1024 may provide a substantial amount of load bearing for the walking beam assembly 1022. In some embodiments, the support beam 1024 may be made of a strong, rigid material, such as steel. Also, in some embodiments, the support beam 1024 may include a plurality of ribs 1206, for example, as shown in FIG. 4. The ribs 1206 may provide additional stiffness without adding significant weight to the walking beam assembly 1022.

As stated, the walking beam assembly may also include a mount member 1026. The mount member 1026 may include a beam attachment portion 1029, which may be rounded. For example, the beam attachment portion 1029 may be cylindrical or disc-shaped. The beam attachment portion 1029 may be at least partly received in the annular portion 1203 of the support beam 1024 as shown in FIG. 2. The beam attachment portion 1029 may be attached to an inner diameter of the annular portion 1203 of the support beam 1024. In some embodiments, the beam attachment portion 1029 may be fixed to the inner diameter of the annular portion 1203. In some embodiments, the beam attachment portion 1029 may be frictionally or interference fit within the annular portion 1203. In other embodiments, the beam attachment portion 1029 may be welded to the annular portion 1203. In further embodiments, the beam attachment portion 1029 may be fixed, but removably attached to the annular portion 1203 via fasteners.

The mount member 1026 may additionally include a chassis attachment portion 1027. The chassis attachment portion 1027 may be hollow and cylindrical in some embodiments represented in FIG. 4. The chassis attachment portion 1027 may be attached to the beam attachment portion 1029 in some embodiments. The chassis attachment portion 1027 may be spaced from the beam attachment portion 1029 in an inboard direction along the transverse axis 1044. As shown in FIG. 4, the chassis attachment portion 1027 may include an opening 1039 that extends through the chassis attachment portion 1027, substantially along the longitudinal axis 1201. Although only one opening 1039 is shown in FIG. 4, it will be appreciated that the opposite side of the chassis attachment portion 1027 may include a similar opening 1039. As will be discussed, the openings 1039 may provide passage of portions of the input drive assembly 1032 through the walls of the chassis attachment portion 1027.

Figure 2:
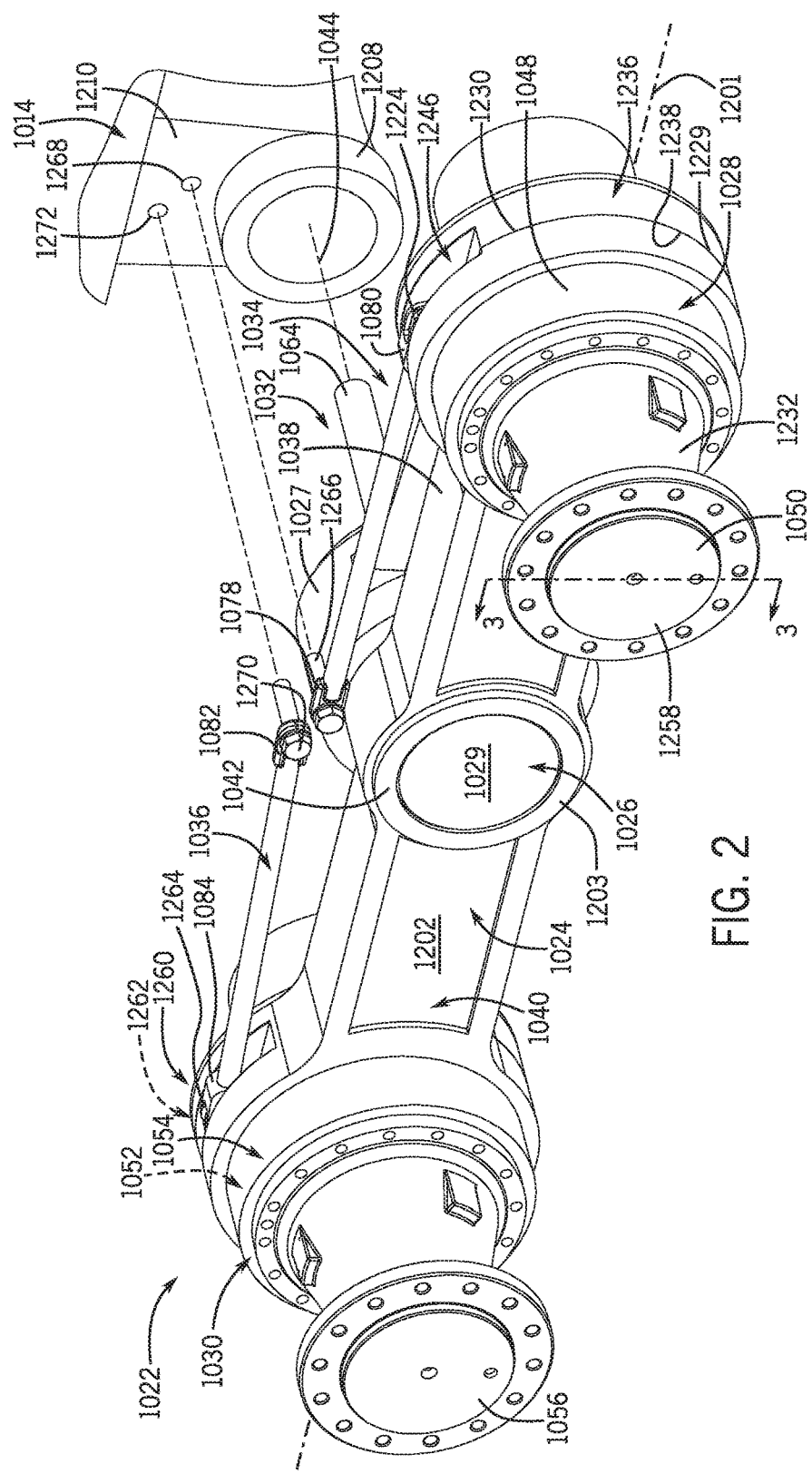
FIG. 2 is a perspective view of the walking beam assembly looking inboard according to example embodiments of the present disclosure.

Furthermore, as shown in FIG. 2, the chassis attachment portion 1027 may be attached to the chassis 1014 of the vehicle. In some embodiments, the chassis attachment portion 1027 may be attached to a ring-shaped portion 1208, which is attached to a base mount 1210 of the chassis 1014. In some embodiments, the chassis attachment portion 1027 may be rotationally coupled to the ring-shaped portion 1208 of the chassis 1014. For example, the chassis attachment portion 1027 may journal on the ring-shaped portion 1208 so as to rotate about the transverse axis 1044. In other embodiments, the chassis attachment portion 1027 may be attached to the ring-shaped portion 1208 via another bearing, such as a roller-element bearing (e.g., with ball bearings and/or rollers).

Figure 3:
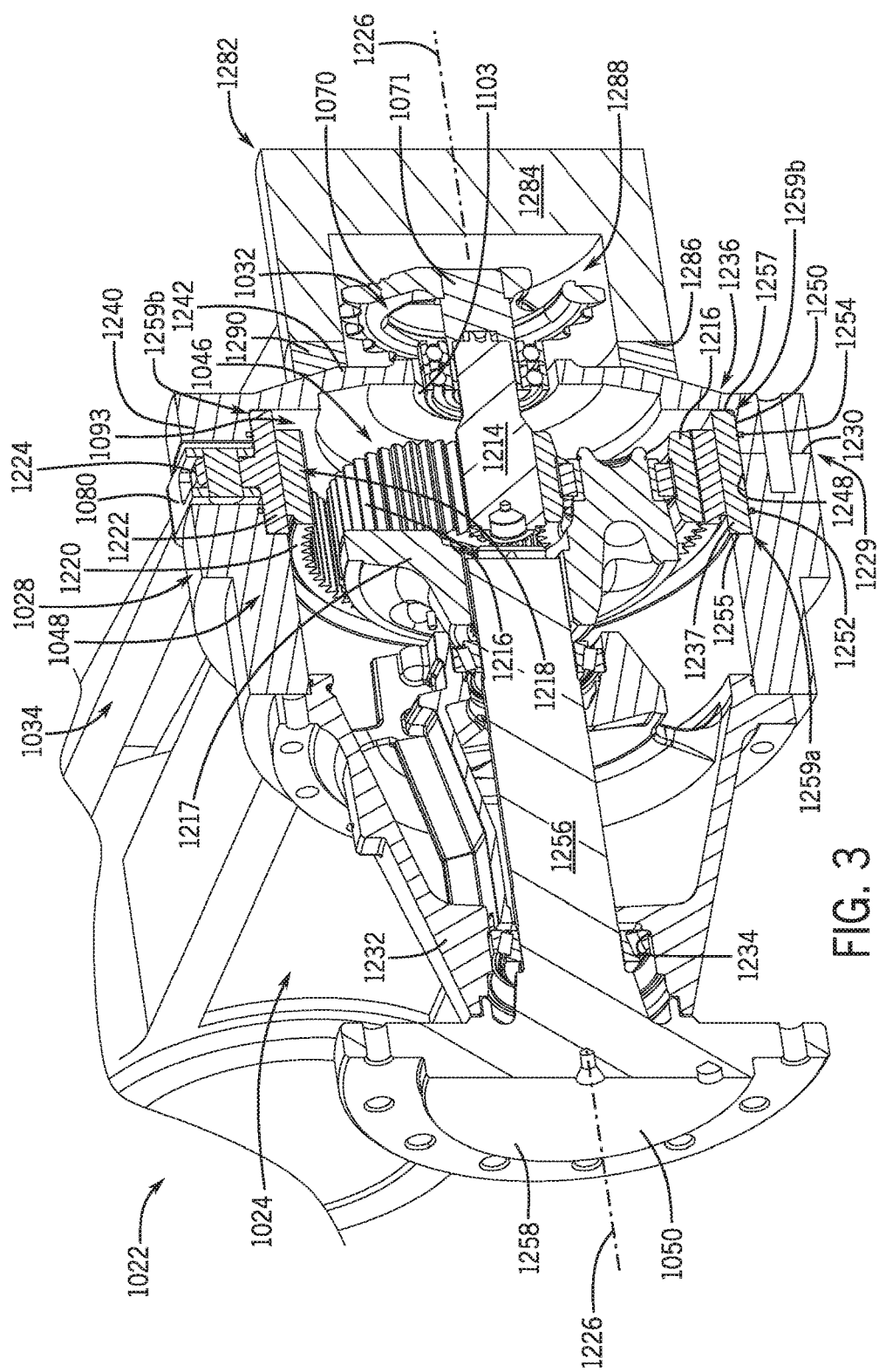
FIG. 3 is a perspective view of the walking beam assembly, wherein the assembly is partially sectioned along the line 3-3 of FIG. 2.
Figure 5:
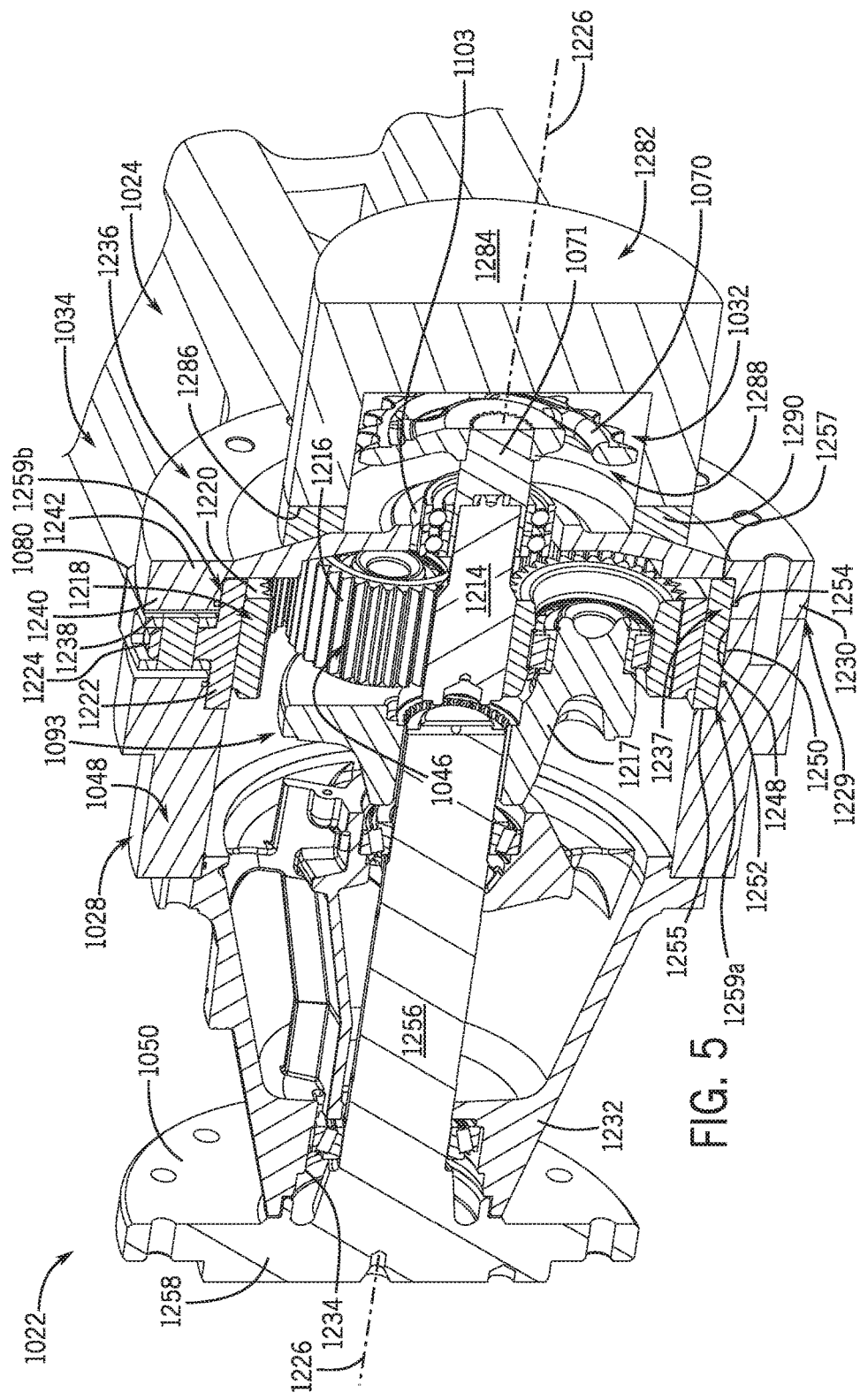
FIG. 5 is a perspective view of the walking beam assembly, wherein the assembly is partially sectioned along the line 5-5 of FIG. 4.

As mentioned, the walking beam assembly 1022 may include a first gear assembly 1028. In general, the first gear assembly 1028 may include a first gear train 1046, which is housed substantially within a first gear housing 1048 as shown in FIGS. 3 and 5.

The first gear train 1046 may include a plurality of intermeshed gears. In some embodiments, the first gear train 1046 may be a planetary gear set, which includes a sun gear 1214, a ring gear 1218, and a plurality of planet gears 1216 that are disposed radially between the sun and ring gears 1214, 1218. In some embodiments, the planetary gears 1216 may be interconnected via a carrier 1217, which is partially shown in FIGS. 3 and 5.

The ring gear 1218 may include a gear portion 1220, an outer ring portion 1222, and an attachment portion 1224. The gear portion 1220 may define an inner diameter of the ring gear 1218. Thus, the gear portion 1220 may include a plurality of teeth that mesh with the plurality of planet gears 1216. Also, the outer ring portion 1222 may encircle the gear portion 1220. In some embodiments, the gear portion 1220 may be frictionally attached (e.g., pressed) within the outer ring portion 1222. The attachment portion 1224 may be a projection (e.g., a short lever) that projects radially away (e.g., upward) from the outer ring portion 1222. In some embodiments, the attachment portion 1224 may be integrally attached to the outer ring portion 1222. In additional embodiments, the attachment portion 1224, the outer ring portion 1222 as well as the gear portion 1220 may be integrally attached to define a unitary, one-piece ring gear 1218.

Figure 6A:
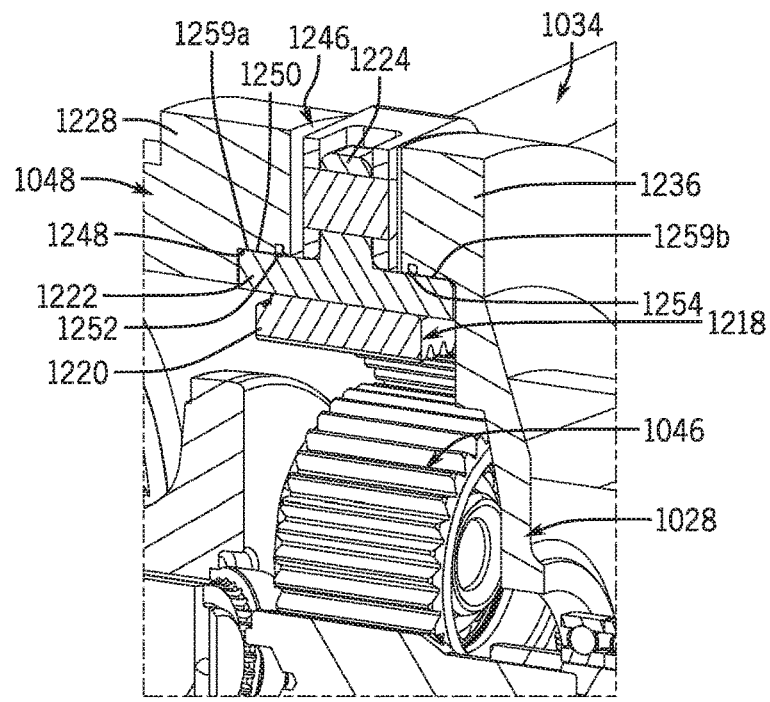
FIG. 6A is a detail view of a journal joint of the walking beam assembly of FIGS. 2-5, wherein the journal joint is shown in a first position.
Figure 6B:
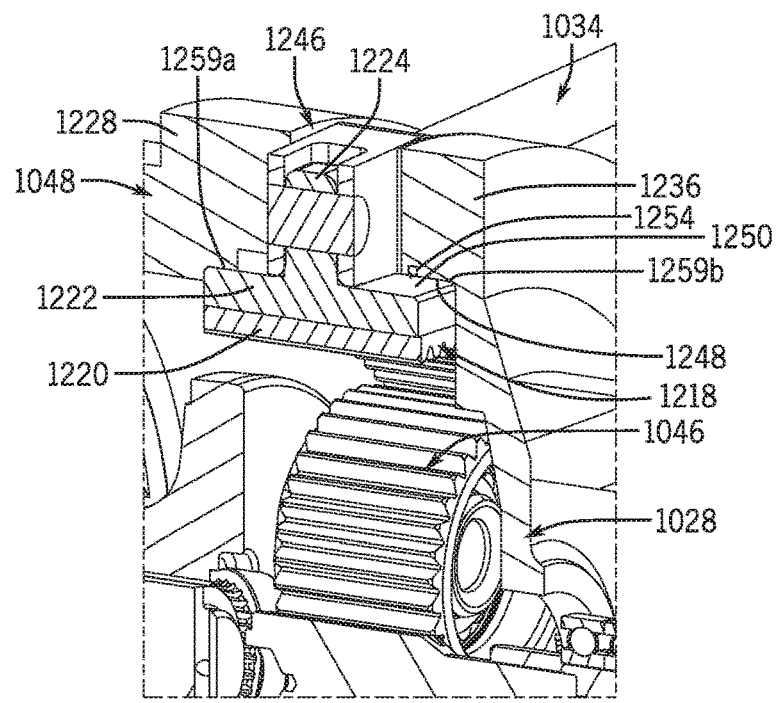
FIG. 6B is a detail view of the journal joint of FIG. 6A, wherein the journal joint is shown in a second position.

Also, an outer surface (i.e., an outer diameter surface) of the outer ring portion 1222 concentric with the inner diameter of the ring gear 1218 may define a first journal surface 1250 as shown, for example, in FIGS. 6A and 6B. As will be discussed in detail below, the first journal surface 1250 may journal against an opposing surface of the first gear housing 1048.

The first gear housing 1048 may be substantially hollow and may be configured to house and support the gear train 1046. In some embodiments, the first gear housing 1048 may be a multi-part shell, with different portions of the shell cooperating to define a hollow interior 1093 of the housing 1048. More specifically, the first gear housing 1048 may generally include a first portion 1228 and a second portion 1236, which are attached together to cooperatively define the hollow interior 1093 of the housing 1048. As shown in FIGS. 3 and 5, the first portion 1228 and second portion 1236 may cooperate to define a pocket 1237 that receives the ring portion 1222 of the ring gear 1218. The pocket 1237 may correspond to the ring portion 1222 such that the surfaces of the pocket 1237 conform to the outer diameter surface of the ring portion 1222 and the inboard and outboard end surfaces of the ring portion 1222.

Specifically, in some embodiments, the first portion 1228 may include a ring 1239 and a frusto-conic portion 1232. The ring 1239 may be annular and ring-shaped so as to encircle the outboard end of the ring portion 1222 of the ring gear 1218. The ring 1239 may be substantially centered about an axis 1226. Also, in some embodiments, the ring 1239 may be integrally attached to the first end 1038 of the support beam 1024. Additionally, the first portion 1228 may include an inboard side surface 1230, which faces toward the inboard side 1204 of the walking beam assembly 1022. Furthermore, the frusto-conic portion 1232 may extend outboard from the ring 1239 to define portions of the outboard side 1202 of the walking beam assembly 1022. A hub opening 1234 may extend through the frusto-conic portion 1232. The hub opening 1234 may be substantially centered on the axis 1226.

The second portion 1236 of the first gear housing 1048 may include a ring 1240 and an end cap 1242. The ring 1240 may be annular and portions may be substantially centered about the axis 1226. The ring 1240 may include an outboard side surface 1238, which overlaps and joins to the inboard side surface 1230 of the first portion 1228 of the housing 1048. The end cap 1242 may be flat and disc-shaped so as to close-off the inboard portion of the first gear housing 1048. The end cap 1242 may include a central opening 1103 extending therethrough. The central opening 1103 may be substantially centered on the axis 1226.

The first gear housing 1048 may also define a first aperture 1246, which exposes a portion of the ring gear 1218. In some embodiments, the aperture 1246 may allow passage of the attachment portion 1224 out of the first gear housing 1048 and/or movement of the attachment portion 1224 relative to the first gear housing 1048. In the illustrated embodiment of FIGS. 2 and 4, the first aperture 1246 is located proximate the upper side 1205 of the walking beam assembly 1022. At this location, the first and second portions 1228, 1236 of the first gear housing 1048 may be spaced apart from each other along the axis 1226. Thus, the first aperture 1246 may be a gap defined between the first and second portions 1228, 1236 of the first gear housing 1048.

Additionally, as shown in FIGS. 3, 5, 6A, and 6B, the first gear housing 1048 may define a second journal surface 1248 of the first gear assembly 1028. Generally, the second journal surface 1248 may oppose and face the first journal surface 1250 of the ring gear 1218. As shown, the second journal surface 1248 may be partially defined by an inner diameter surface of the first portion 1228 of the first gear housing 1048. Also, the second journal surface 1248 may be partially defined by an inner diameter surface of the second portion 1236 of the first gear housing 1048. As such, the first journal surface 1250 may journal against the second journal surface 1248 such that the ring gear 1218 may rotate about the axis 1226 relative to the first gear housing 1048. It will be appreciated that the opposing journal surfaces 1248, 1250 are able to slide over each other as the ring gear 1218 rotates about the axis 1226 relative to the housing 1048. Thus, the opposing journal surfaces 1248, 1250 may cooperate to define at least one journal joint 1259*a*, 1259*b* between the ring gear 1218 and the first gear housing 1048. This journaling is illustrated, for example in FIGS. 6A and 6B. Specifically, the journal joint 1259*a* allows the ring gear 1218 to rotate relative to the first gear housing 1048 between a first position (FIG. 6A) and a second position (FIG. 6B).

The first gear housing 1048 may also include one or more seals 1252, 1254. In the embodiment illustrated, there includes a first seal 1252 and a second seal 1254. The seals 1252, 1254 may be O-ring seals that are received in recesses formed in the first gear housing 1048. The first seal 1252 may be spaced in an inboard direction (along the axis 1226) from an outboard side 1255 of the ring gear 1218. Also, the second seal 1254 may be spaced in an outboard direction (along the axis 1226) from an inboard side 1257 of the ring gear 1218. The seals 1252, 1254 may provide a fluid barrier that maintains lubricant within the journal joints 1259*a*, 1259*b*. Accordingly, the journal joint 1259*a* may be defined between the outboard side 1255 of the ring gear 1218 and the first seal 1252. Also, the journal joint 1259*b* may be defined between the inboard side 1257 of the ring gear 1218 and the second seal 1254.

In some embodiments, the first and second portions 1228, 1236 of the first gear housing 1048 may be connected at a junction 1229 (FIGS. 2 and 4). For example, the majority of the inboard side surface 1230 of the first portion 1228 may face and connect to the outboard side surface 1238 of the second portion 1236. The junction 1229 may extend circumferentially about the axis 1226. As shown in FIGS. 3 and 5, the junction 1229 may be disposed between the first seal 1252 and the second seal 1254 relative to the axis 1226. Thus, the junction 1229 may be defined between the journal joints 1259*a*, 1259*b* relative to the axis 1226. Accordingly, the seals 1252, 1254 may prevent the leakage of oil through the junction 1229.

It will be appreciated that the first gear assembly 1028 may be relatively compact and lightweight. For example, the journal joint 1259a, 1259b may provide a rotatable attachment in a relatively compact space. There may be no need for a separate roller element bearing (ball bearings or roller bearings) between the ring gear 1218 and the gear housing 1048. Also, the journal joints 1259a, 1259b allow the gear housing 1048 to closely conform in shape to the gear train 1046.

Furthermore, the gear housing 1048 may provide robust support to the ring gear 1218 and other portions of the gear train 1046. More specifically, the pocket 1237 within the gear housing 1048 may closely conform to the ring gear 1218 and support the outer diameter portions of the ring gear 1218 as well as the outboard side 1255 and the inboard side 1257 of the ring gear 1218.

Additionally, the width of the aperture 1246 (measured along the axis 1226) may be relatively small. In some embodiments, the aperture 1246 may be slightly wider than the attachment portion 1224 of the ring gear 1218. As such, the internal sides of the aperture 1246 may be disposed proximate the attachment portion 1224 and, in some cases, may limit movement of the attachment portion 1224 along the transverse axis 1226. Accordingly, articulation of the ring gear 1218 relative to the gear housing 1048 may be supported in the radial and transverse directions relative to the axis 1226.

Furthermore, the configuration of the first gear assembly 1028 may provide manufacturing efficiencies. This is because there may be fewer parts as compared to conventional walking beam structures. Accordingly, the total part cost and the time for assembly may be reduced.

Moreover, lubrication of the first gear assembly 1028 may be facilitated due to its configuration. For example, because of the arrangement of the seals 1252, 1254, the journal joints 1259a, 1259b may be in fluid communication with the interior 1093 of the gear housing 1048. Thus, in some embodiments, lubricant may flow between the journal joints 1259a, 1259b and the first gear train 1046. In other words, the same supply of lubricant that lubricates the first gear train 1046 may lubricate the journal joints 1259a, 1259b. In some embodiments, one or both journal surfaces 1248, 1250 may include a groove to increase the flow of lubricant to the journal joints 1259a, 1259b.

Additionally, a first wheel hub 1050 may be attached to the first gear train 1046. For example, the first wheel hub 1050 may include a shaft 1256, which is received within the hub opening 1234 and which is fixed to the carrier 1217 of the first gear train 1046. The shaft 1256 may be rotatably supported by the first gear housing 1048 via bearings (e.g., roller element bearings such as ball or roller bearings). As such, the shaft 1256 may rotate relative to the first gear housing 1048 about the axis 1226. The first wheel hub 1050 may also include an end plate 1258, which is fixed to one end of the shaft 125, and which is disposed outside the first gear housing 1048. The wheel 16b (FIG. 1) may be attached to the end plate 1258 of the first wheel hub 1050.

As mentioned above, the walking beam assembly 1022 may additionally include the second gear assembly 1030. The second gear assembly 1030 may be substantially similar to the first gear assembly 1028, except the second gear assembly 1030 may be mounted on the second end 1040 of the support beam 1024. Accordingly, the second gear assembly 1030 may include a second gear train 1052 and a second gear housing 1054.

The second gear train 1052 may include a ring gear 1262, which may be substantially similar to the ring gear 1218 of the first gear assembly 1028 described above. Thus, the ring gear 1262 may include an attachment portion 1264. The attachment portion 1264 may extend out of the second gear assembly 1030 via a second aperture 1260 defined in the second gear housing 1054. The second aperture 1260 may be disposed on the second gear housing 1054 proximate the upper side 1205 of the walking beam assembly 1022. In other embodiments, the second aperture 1260 may be disposed on the second gear housing 1054 proximate the lower side 1207 of the walking beam assembly 1022.

The second wheel hub 1056 may be attached to the second gear train 1052 as discussed above in relation to the first gear train 1046. Also, the second wheel hub 1056 may be mounted for rotation relative to the second gear housing 1054. The wheel 16c (FIG. 1) may be attached to the second wheel hub 1056.

As mentioned above, the walking beam assembly 1022 may include the input drive assembly 1032. Generally, the input drive assembly 1032 may include at least one movable part and an input drive housing 1086. As will be discussed, the movable parts may be operatively connected to a transmission system of the vehicle 10 for delivering torque from the engine 18 to the gear assemblies 1028, 1030. The input drive housing 1086 may enclose (i.e., house) the movable parts. Also the input drive housing 1086 may protect the movable parts and/or contain lubricant for lubricating the movable parts.

In some embodiments, the input drive assembly 1032 may include a half shaft 1064 on which is mounted a first central wheel 1066. The first central wheel 1066 is received within the chassis attachment portion 1027 of the mount member 1026. The outboard end of the half shaft 1064 may also be supported for rotation by the beam attachment portion 1029 (e.g., by a bearing that is mounted to the beam attachment portion 1029). Thus, the half shaft 1064 and first central wheel 1066 may rotate as a unit about the axis 1044.

Additionally, in certain embodiments the movable parts of the input drive assembly 1032 may include a first end wheel 1070, which is mounted on a first end shaft 1071 as shown in FIGS. 3 and 5. The first end wheel 1070 may be spaced apart from the first central wheel 1066. The first end wheel 1070 may be operatively connected to the first central wheel 1066 via a first linkage 1074, which is shown in phantom in FIG. 4. In some embodiments, the central wheel 1066 and end wheel 1070 may be sprockets, and the linkage 1074 may be a chain that engages the respective wheels 1066, 1070. In other embodiments, the wheels 1066, 1070 may have substantially smooth outer diameter surfaces, and the linkage 1074 may be a belt that frictionally engages the outer diameter surface of the wheels 1066, 1070.

Although not shown, the input drive assembly 1032 may further include a second central wheel that is mounted on the half shaft 1064, similar to the first central wheel 1066. The second central wheel may be disposed on the shaft 1064, relative to the axis 1044, between the first central wheel 1066 and the beam attachment portion 1029 of the mount member 1026. Moreover, the input drive assembly 1032 may include a second end wheel 1072, a second end shaft 1073, and a second linkage 1076 that operatively connects the second central wheel and the second end wheel 1072.

The input drive assembly 1032 may additionally include an input drive housing 1086. The housing 1086 may enclose and house the majority of the input drive assembly 1032 to cover over and protect the components from dirt, debris, and other undesirable objects. The housing 1086 may also contain a lubricant for the components of the input drive assembly 1032.

Portions of the input drive housing 1086 have been removed from FIG. 4 for purposes of clarity (i.e., to reveal the second linkage 1076, the second end wheel 1072, and the second end shaft 1073). However, FIG. 4 does show portions of the input drive housing 1086 that are proximate the first end 1038 and the first gear assembly 1028. It will be appreciated that the housing 1086 may include corresponding portions on the opposite side of the axis 1044 that cover over and protect the second linkage 1076, the second end wheel 1072, and the second end shaft 1073.

In some embodiments, the input drive housing 1086 may include a linkage covering 1274. The linkage covering 1274 may enclose and house the majority of the first linkage 1074. The input drive housing 1086 may also include an end covering 1282. The end covering 1282 may enclose and house the first end wheel 1070 and the first end shaft 1071 as well as the portion of the first linkage 1074 that engages the first end wheel 1070. In some embodiments, the input drive housing 1086 may further include a central covering 1280.

The linkage covering 1274 may extend between the central covering 1280 and the end covering 1282. In some embodiments, the linkage covering 1274 may include a first member 1276 and a second member 1278. The first member 1276 may be hollow with a rectangular cross section, and an upper segment of the first linkage 1074 may extend through the hollow first member 1276 in some embodiments. Likewise, the second member 1278 may be hollow with a rectangular cross section, and a lower segment of the first linkage 1074 may extend through the hollow second member 1278.

In some embodiments, the first and second members 1276, 1278 of the linkage covering 1274 may connect to the central covering 1280. The central covering 1280 may be a covering that closes off and seals the opening 1089 in the mount member 1026. The central covering 1280 may be attached, for example, to the chassis attachment portion 1027 so as to close off and seal the opening 1089. The hollow interior of the first and second members 1276, 1278 may be in fluid communication with the inboard opening 1212 of the mount member 1026. As such, the mount member 1026 may enclose the central wheels 1066 and the half shaft 1064. The first linkage 1074 may pass from the mount member 1026 and through the central covering 1280 to be received within the first and second members 1276, 1278 of the input drive housing 1086.

Figure 8:
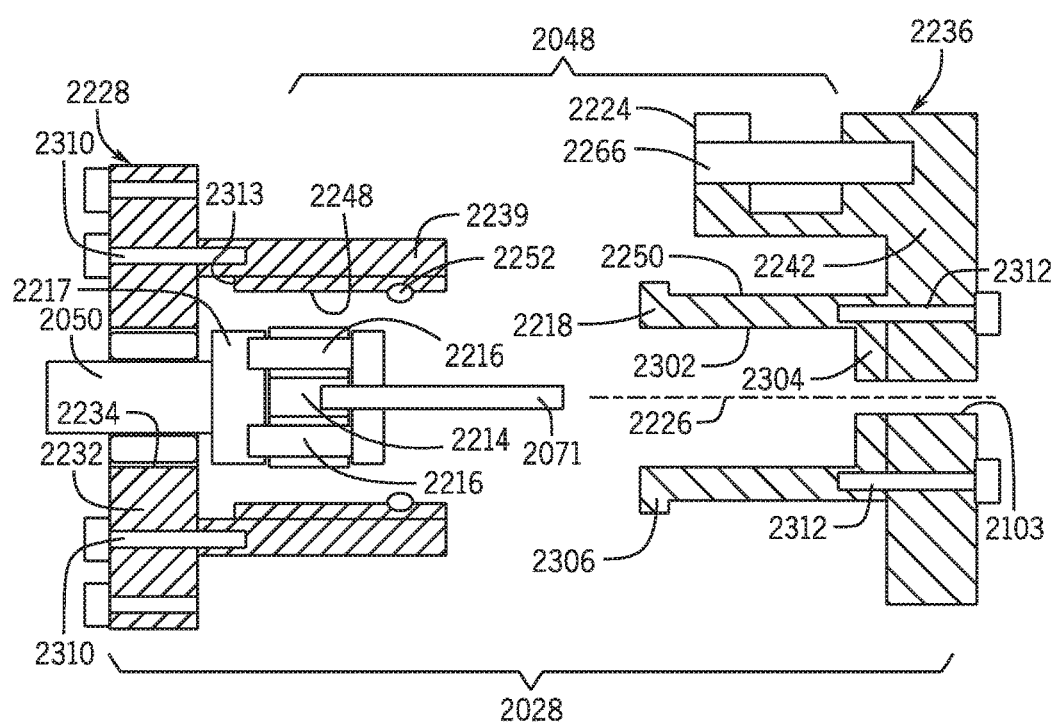
FIG. 8 is a schematic exploded view of the gear assembly of FIG. 7.

The end covering 1282 of the input drive housing 1086 may be rounded and somewhat disc shaped. The end covering 1282 may include a closed inboard side 1284 and an open outboard side 1286. The end covering 1282 may define an internal space 1288, which receives the end wheel 1070 and the first end shaft 1071 as shown in FIGS. 6 and 8. The internal space 1288 may be in fluid communication with the first and second members 1276, 1278 of the linkage covering 1274. Also, the outboard side 1286 of the end covering 1282 may encircle the opening 1103 of the first gear housing 1048. Accordingly, the first end shaft 1071 may be aligned with and received within the opening 1103 of the first gear housing 1048. The first end shaft 1071 may be fixed to the sun gear 1214 of the first gear train 1046 such that the first end shaft 1071 and sun gear 1214 rotate as a unit about the axis 1226.

Also, the outboard side 1286 of the end covering 1282 may be attached to the opposing surface of the end cap 1242. In some embodiments, a seal 1290 may be included therebetween to substantially seal this junction. In some embodiments, the seal 1290 may prevent leakage of lubricant that is flowing between the end covering 1282 and the first gear housing 1048.

The end covering 1282 may be fixed to the end cap 1242 of the first gear housing 1048. In some embodiments, the end covering 1282 may be removably attached to the first gear housing 1048, for example, using fasteners. Also, the central covering 1280 may be removably attached to the mount member 1026, for example, using fasteners. It will be appreciated, however, that the end covering 1282 and/or central covering 1280 may be attached in other ways, for example, welding. Thus, the input drive assembly 1032 (including the housing 1086) may rotate as a unit with the support beam 1024, the first gear assembly 1028 and the second gear assembly 1030.

In some embodiments, the intermediate portion (i.e., the linkage covering 1274) of the input drive housing 1086 may be spaced apart and detached from the support beam 1024 and the gear housing 1048. In other words, the first and second members 1276, 1278 of the linkage covering 1274 may be supported on each end by the central covering 1280 and the end covering 1282 but otherwise free of the support beam 1024 and the gear housing 1048.

It will be appreciated that the input drive housing 1086 may be relatively compact and lightweight. However, the input drive housing 1086 may provide protection to the internal components of the input drive assembly 1032. Specifically, the drive housing 1086 may be made of lightweight but strong material (e.g., carbon composite or thin-walled metal) because the support beam 1024 may instead be the primary load-bearing member of the assembly 1022, especially in bending about the axis 1044. Also, the first member 1279 and the second members 1278 may be tailored to enclose respective segments of the first linkage 1074, thereby eliminating excess material on the housing 1086.

Furthermore, the housing 1086 may be fluidly connected to the mount member 1026 and the first gear housing 1048 to thereby allow a lubricant to flow continuously through these members. Accordingly, the same supply of lubricant that lubricates the input drive assembly 1032 may also lubricate the first gear train 1046. In some embodiments, portions of the housing 1086 proximate the second end 1040 of the support beam 1024 may be substantially similar to those illustrated for the first end 1038; therefore, the same supply of lubricant that lubricates the input drive assembly 1032 may also lubricate the first gear train 1046 and the second gear train 1052. This same supply of lubricant may also lubricate the journal joints 1259a, 1259b as discussed above. As such, filling and replacing the assembly 1022 with lubricant may be facilitated since there may be a single cavity to fill/replace.

As mentioned above, the walking beam assembly 1022 may also include a first reaction member 1034 and a second reaction member 1036. The first reaction member 1034 may be an elongate and rigid member, such as a bar, rod, or pole. The second reaction member 1036 may be substantially similar.

The first reaction member 1034 may include a first end 1078 that includes a pin 1266 that is received in a first hole 1268 of the chassis 1014. The pin 1266 may, thus, pivotally attach the first end 1078 of the reaction member 1034 to the chassis 1014. Also, the first reaction member 1034 may include a second end 1080 that is attached to the attachment portion 1224 of the first gear assembly 1028. In some embodiments, the second end 1080 may be received within the aperture 1246 of the first gear housing 1048 to attach to the attachment portion 1224. Also, in some embodiments, the second end 1080 may be pivotally attached to the attachment portion 1224, for example, by a pin or other fastener.

Likewise, the second reaction member 1036 may include a first end 1082 that is pivotally coupled to the chassis 1014. In some embodiments, the first end 1082 may include a pin 1270 that is received within a second hole 1272 of the chassis 1014 to pivotally attach the first end 1082 to the chassis 1014. Also, the second reaction member 1036 may include a second end 1084 that is pivotally coupled to the attachment portion of the second gear assembly 1030.

During operation and travel of the vehicle 10, torque delivered from the engine 18 (FIG. 1) may transfer through the half shaft 1064 to rotate the central wheels 1066, which causes rotation of the first end wheel 1070 and the second end wheel 1072. This, in turn, rotates the first end shaft 1071 and the second end shaft 1073 for rotating the sun gears 1214 of the first and second gear trains 1046, 1052. The first and second gear trains 1046, 1052 may each have a predetermined gear ratio for increasing the torque delivered to the first and second hubs 1050, 1056. Accordingly, a high amount of torque may be delivered to the wheels 16b, 16c of the work vehicle 10.

In some scenarios, an increase of power from the engine 18 may tend to rotate the walking beam assembly 1022 about the axis 1044, lifting the wheel 16b (the leading wheel) from the ground while increasing the downward pressure on the wheel 16c (the following wheel). To counteract this tendency, the reaction members 1034, 1036 provide an opposing force, transferring torque directly to the chassis 1014. Also, a sudden decrease in power from the engine 18 may reverse the direction of rotation of the walking beam assembly 1022 about the axis 1044; however, these forces may be counteracted by the reaction members 1034, 1036.

More specifically, power increase from the engine 18 may tend to rotate the walking beam assembly 1022 about the axis 1044, lifting the wheel 16b from the ground while driving the wheel 16c toward the ground. The first reaction member 1034 is placed in tension and the second reaction member 1036 is placed in compression due to the rotation of the walking beam assembly 1022 about the axis 1044. Thus, the first reaction member 1034 pushes against the attachment portion 1224 of the ring gear 1218 to push the ring gear 1218 tangentially in rotation about the axis 1226. This reaction causes the ring gear 1218 to rotate about the axis 1226 relative to the first gear housing 1048 and relative to the planetary gears 1216. The opposite reaction may occur at the second reaction member 1036, which pulls the second ring gear 1262 in rotation about its respective axis relative to the second gear housing 1054 and relative to the planetary gears within the second gear train 1052. As a result, downforce at the wheel 16b increases and downforce at the wheel 16c decreases, thereby maintaining substantially equal downforce between the wheels 16b, 16c.

These reaction forces may occur, for example, when the vehicle 10 is travelling in a forward direction (i.e., when the wheel 16b is leading the wheel 16c). It will be appreciated that the reactions may be opposite to those described above if, for example, the vehicle 10 is travelling in reverse (i.e., when the wheel 16c is leading the wheel 16b).

Accordingly, the walking beam assembly 1022 may provide stable support for the vehicle 1022 while torque is delivered to the tandem driven wheels 16b, 16c. Also, the walking beam assembly 1022 may be relatively compact and may be manufactured efficiently, for example, due to the configuration of the journal joints 1259a, 1259b. Additionally, the same supply of lubricant may flow between the journal joints 1259a, 1259b, the gear trains 1046, 1052, and the moving parts of the input drive assembly 1032 for efficient lubrication of the walking beam assembly 1022.

Figure 7:
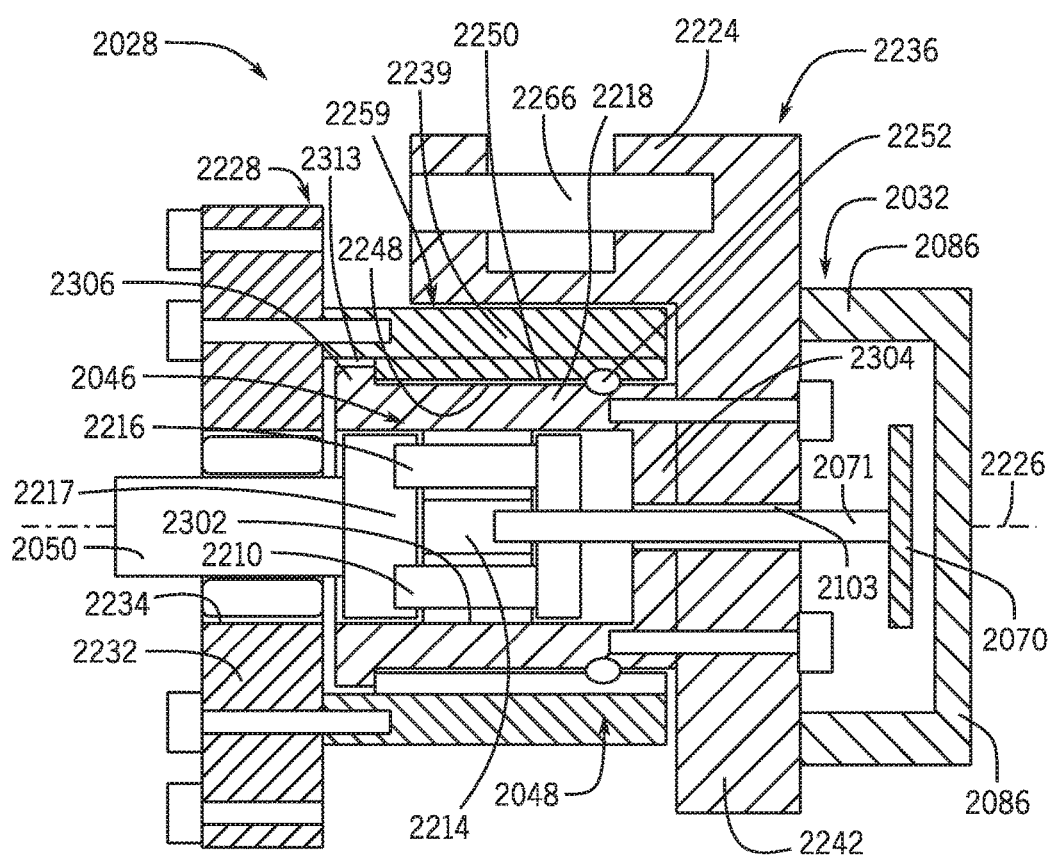
FIG. 7 is a schematic view of a gear assembly according to additional example embodiments of the present disclosure.

Referring now to FIGS. 7 and 8, the first gear assembly 2028 will be discussed according to additional embodiments of the present disclosure. In some embodiments, the first gear assembly 2028 may be incorporated within the walking beam assembly 1022 instead of the first gear assembly 1028. The first gear assembly 2028 may include features that correspond to those of the first gear assembly 1028 of FIGS. 2-6B. Corresponding features will be identified with corresponding reference numbers increased by 1000 and details about those features included above will not be repeated. Furthermore, it will be appreciated that the second gear housing of the walking beam assembly may correspond to the gear assembly 2028 shown in FIGS. 7 and 8.

The gear assembly 2028 may include a gear train 2046. The gear train 2046 may be a planetary gear set so as to include a sun gear 2214, a plurality of planetary gears 2216, and a ring gear 2218. A carrier 2217 may also be attached to the planetary gears 2216, and the hub 2050 may be attached to the carrier 2217.

The ring gear 2218 may include gear teeth 2302 on its inner diameter portion. Also, the ring gear 2218 may include a first journal surface 2250 on its outer diameter portion. In some embodiments, the ring gear 2218 may include a disc-shaped end cap 2304 on one side (e.g., the inboard side). Additionally, the ring gear 2218 may include a shoulder 2306 on the opposite side (i.e., the outboard side) of the ring gear 2218. The shoulder 2306 may extend outward radially away from the axis 2226.

Furthermore, first gear assembly 2028 may include a gear housing 2048. Generally, the gear housing 2048 may include a first portion 2228 and a second portion 2236.

The first portion 2228 of the housing 2048 may include a ring 2239. An inner diameter portion of the ring 2239 may define a second journal surface 2248 for the gear assembly 2028 as will be discussed in greater detail below. Also, the first portion 2228 may include an outboard portion 2232, which may be substantially disc-shaped. The first portion 2228 may be fixed to the ring 2239. In some embodiments, for example, the first portion 2228 may be removably attached to the ring 2239 via fasteners 2310. The first portion 2228 may also include an annular recess 2313, which is disposed on an inner diameter portion of the ring 2239, between the outboard portion 2232 and the journal surface 2248. The outboard portion 2232 may include a hub opening 2234, which allows passage of the hub 2050.

The second portion 2236 of the gear housing 2048 may include a disc-shaped end cap 2242. The end cap 2242 may be attached to the ring gear 2218. For example, the end cap 2304 of the ring gear 2218 may be fixed to the end cap 2242 of the second portion 2236 of the gear housing 2048. In some embodiments, the end caps 2304, 2242 may be removably attached via one or more fasteners 2312. The end cap 2242 of the second portion 2236 of the housing 2048 may additionally include a central opening 2103 through which the end shaft 2071 extends. The input drive housing 2086 may be attached to the inboard surface of the end cap 2242, similar to the embodiments discussed above. The second portion 2236 may additionally include an attachment portion 2224. The attachment portion 2224 may be connected (e.g., fixed) to the end cap 2242 and may extend in an outboard direction, generally parallel to the axis 2226. The attachment portion 2224 may provide an area for attaching the first reaction member 1034 of the walking beam assembly 1022.

For example, the attachment portion 2224 may include a pin 2266 that is fixed at both ends to the attachment portion 2224.

As shown in FIG. 7, when the gear assembly 2028 is assembled, the outboard shoulder 2306 of the ring gear 2218 may be received within the recess 2313 of the first portion 2228. The shoulder 2306 may apply pressure to the inner surface of the recess 2313 to compress the first and second portions 2228, 2236 together. Also, the teeth 2302 of the ring gear 2218 may engage the teeth of the planetary gears 2216.

Furthermore, the first journal surface 2250 of the gear 2218 may face the second journal surface 2248 of the first portion 2228 of the gear housing 2048. The journal surface 2250 may rotate and journal on the journal surface 2248 to define a journal joint 2259. Accordingly, the second portion 2236 of the housing 2048 and ring gear 2218 may rotate (i.e., journal) as a unit about the axis 2226 relative to the first portion 2228 of the housing 2048 and the other parts of the gear train 2046.

During operation, torque may be transferred to the wheel hub 2050 and the opposing wheel hub (not shown) on the opposite end of the walking beam assembly. As discussed, forces may cause the walking beam assembly to rotate relative to the chassis of the vehicle, causing one wheel to lift off of the ground and causing the other wheel to apply more pressure to the ground. The reaction member 1034 may counteract this rotational force by transferring a reaction force from the gear housing 2048 into the chassis as the first journal surface 2250 journals on the second journal surface 2248. Accordingly, the walking beam assembly may remain level to the ground and the wheels may apply equal downforce to the ground.

In some embodiments, the gear assembly 2028 may include a seal 2252. The seal 2252 may be an O-ring seal. Also, the seal 2252 may be disposed between the journal surfaces 2250, 2248, proximate the end cap 2242. The seal 2252 may prevent or inhibit lubricant that is provided between the journal surfaces 2250, 2248 from leaking out of the gear housing 2048. Additionally, as discussed above, the same supply of lubricant that lubricates the gear train 2046 may also lubricate the journal joint 2259. In some embodiments, at least one of the journal surfaces 2250, 2248 may include a groove for routing lubricant to the journal joint 2259.

Like the embodiments of FIGS. 2-6B, the gear assembly 2028 may provide a compact and efficient journal joint 2259 for the reaction members of a walking beam assembly. The joint 2259 may facilitate manufacture of the gear assembly 2028 because there may be relatively few parts to manufacture and assemble. Furthermore, lubrication of the joint 2259 may be achieved with the lubricant that lubricates the gear train 2046 for added convenience.

The walking beam assembly of the present disclosure may vary from those described above. For example, in a variation of the walking beam assembly of FIGS. 2-6B, the second end 1080 of the first reaction member 1034 may be attached to the carrier 1217. The carrier 1217 may include a first journal surface that journals against a second journal surface of the first gear housing 1048. In other words, the first journal joint 1259a may be defined between the carrier 1217 and the first gear housing 1048 in some embodiments. Likewise, the second journal joint 1259b may be defined between the carrier of the second gear assembly 1030 and the second gear housing 1054.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A torque compensating walking beam assembly for a vehicle that includes an engine, a chassis, and a wheel, the walking beam assembly comprising:
   a support beam that includes an end;
   a mount member that is configured to mount the support beam on the chassis such that the support beam is able to rotate relative to the chassis;
   a gear assembly that is supported by the support beam, the gear assembly including a gear train and a gear housing, the gear train operably coupled to a wheel hub, the wheel hub configured to support a wheel of the vehicle, the gear housing substantially enclosing the gear train, the gear train including a gear with a first journal surface, the gear housing including a second journal surface, the first journal surface and the second journal surface cooperating to define a journal joint;
   an input drive assembly configured to deliver an input torque from the engine to the gear train, the input drive assembly including at least one movable part and an input drive housing that substantially encloses the at least one movable part within an interior of the input drive housing; and
   a reaction member configured to connect to the chassis, the reaction member connected to one of the gear housing and the gear of the gear train, the reaction member configured to transfer a reaction force between the chassis and the one of the gear housing and the gear of the gear train as the first journal surface journals on the second journal surface;
   wherein the journal joint is in fluid communication with an interior of the gear housing and the interior of the input drive housing to allow a lubricant to flow between the journal joint, the gear train, and the at least one movable part.

2. The torque compensating walking beam assembly of claim 1, wherein the gear housing includes a first portion and a second portion;
   wherein the gear train is a planetary gear train with a sun gear, a plurality of planetary gears, and a ring gear, wherein the ring gear includes the first journal surface;
   wherein the ring gear is fixed to the second portion of the gear housing;
   wherein the first portion of the gear housing receives the ring gear;

wherein the first portion of the gear housing includes the second journal surface; and wherein the reaction member is connected to the second portion of the gear housing.

3. The torque compensating walking beam assembly of claim 1, wherein at least part of the gear housing is integrally attached to the support beam.

4. The torque compensating walking beam assembly of claim 1, wherein the gear train is a planetary gear train with a sun gear, a plurality of planetary gears, and a ring gear; and wherein the gear housing includes a pocket that receives the ring gear; and wherein the pocket defines the second journal surface.

5. The torque compensating walking beam assembly of claim 1, wherein the gear train is a planetary gear train with a sun gear, a plurality of planetary gears, and a ring gear; and wherein the ring gear member includes the first journal surface.

6. The torque compensating walking beam assembly of claim 5, wherein the ring gear includes:

an inner diameter portion that includes a plurality of teeth that mesh with the plurality of planetary gears;

an outer diameter portion that includes the first journal surface;

and an attachment portion that projects from the outer diameter portion, the attachment portion being pivotally connected to the reaction member.

7. The torque compensating walking beam assembly of claim 6, wherein the gear housing includes an aperture through which the attachment portion extends out of the gear housing.

8. The torque compensating walking beam assembly of claim 7, wherein the gear housing includes a first portion and a second portion;

wherein the aperture is defined between the first portion and the second portion of the gear housing;

wherein the first portion and the second portion of the gear housing cooperate to define the second journal surface.

9. The torque compensating walking beam assembly of claim 8, wherein the first portion and the second portion are attached together at a junction;

further comprising a first seal and a second seal that are both disposed between the first journal surface and the second journal surface;

wherein the first journal surface is configured to journal about an axis relative to the second journal surface; and wherein the junction is defined between the first seal and the second seal relative to the axis.

10. A method of manufacturing a torque compensating walking beam assembly for a vehicle that includes an engine, a chassis, and a wheel, the method comprising:

providing a support beam configured to be mounted to the chassis for rotation relative to the chassis;

assembling a gear assembly, the gear assembly including a gear housing and a planetary gear train, the planetary gear train including a ring gear having an inner diameter with teeth and an outer diameter concentric with the inner diameter, the outer diameter defining a first journal surface, the gear housing including a second journal surface that is configured to journal on the first journal surface, the first journal surface and the second journal surface defining a journal joint that is concentric with the outer diameter;

supporting the gear assembly on the support beam; and attaching a reaction member to one of the gear housing and the planetary gear train, the reaction member configured to connect to the chassis, the reaction member configured to transfer a reaction force between the chassis and the one of the gear housing and the gear of the planetary gear train as the first journal surface journals on the second journal surface.

11. The method of claim 10, wherein the planetary gear train includes a sun gear and a plurality of planetary gears that mesh with the teeth of the ring gear.

12. The method of claim 11, wherein assembling the gear assembly includes:

fixing the ring gear to a first portion of the gear housing; and attaching the first portion of the gear housing to a second portion of the gear housing;

wherein the second portion of the gear housing includes the second journal surface; and attaching the reaction member includes attaching the reaction member to the chassis and the first portion of the gear housing.

13. The method of claim 11, wherein assembling the gear assembly includes disposing the ring gear within a pocket of the gear housing; and wherein the pocket defines the second journal surface.

14. The method of claim 11, further comprising extending an attachment portion of the ring gear out of the gear housing; and pivotally attaching the reaction member to the attachment portion of the ring gear.

15. The method of claim 14, wherein assembling the gear assembly includes attaching a first portion of the gear housing to a second portion of the gear housing to define an aperture between the first and second portions of the gear housing;

wherein extending the attachment portion includes extending the attachment portion through the aperture; and wherein the first portion and the second portion of the gear housing cooperate to define the second journal surface.

16. A torque compensating walking beam assembly for a vehicle that includes an engine, a chassis, and a wheel, the walking beam assembly comprising:

a support beam that includes an end;

a mount member that is configured to mount the support beam on the chassis such that the support beam is able to rotate relative to the chassis;

a gear assembly that is supported by the support beam, the gear assembly including a planetary gear train and a gear housing, the planetary gear train operably coupled to a wheel hub, the wheel hub configured to support a wheel of the vehicle, the gear housing substantially enclosing the planetary gear train, the planetary gear train including a ring gear having an inner diameter with teeth and an outer diameter concentric with the inner diameter, the outer diameter defining a first journal surface, the gear housing including a second journal surface, the first journal surface and the second journal surface defining a journal joint that is concentric with the outer diameter;

an input drive assembly configured to deliver an input torque from the engine to the planetary gear train; and a reaction member configured to connect to the chassis, the reaction member connected to one of the gear housing and the gear of the planetary gear train, the reaction member configured to transfer a reaction force between the chassis and the one of the gear housing and the gear of the planetary gear train as the first journal surface journals on the second journal surface.

17. The torque compensating walking beam assembly of claim 16, wherein the reaction member is a first reaction member and further including a second reaction member;
- wherein the first reaction member is connected to the chassis and the first ring gear; and
- wherein the second reaction member is connected to the chassis and the second ring gear.

18. The torque compensating walking beam assembly of claim 16, wherein the reaction member is a first reaction member and further including a second reaction member;
- wherein the first reaction member is connected to the chassis and the first gear housing; and
- wherein the second reaction member is connected to the chassis and the second gear housing.

\* \* \* \* \*